United States Patent [19]

Stuart

[11] 4,008,812
[45] Feb. 22, 1977

[54] STICK STORAGE APPARATUS WITH AUTOMATIC REJECT SYSTEM FOR MISALIGNED STICKS

[75] Inventor: Meredith Stuart, Rogers, Ark.

[73] Assignee: Forster Mfg. Co., Inc., Wilton, Maine

[22] Filed: Sept. 15, 1975

[21] Appl. No.: 613,353

[52] U.S. Cl. .............................. 214/6 BA; 198/384; 198/392; 211/49 D; 221/160; 312/223
[51] Int. Cl.² ........................................ B65G 37/30
[58] Field of Search ......... 214/6 BA, 6 TS, 8, 16 B; 221/10, 65, 159, 160; 198/37, 20 R, 45, 268–271, 276, 287, 288; 193/2 C; 211/49 D; 53/200; 312/186, 197, 223, 226

[56] References Cited
UNITED STATES PATENTS

| | | | |
|---|---|---|---|
| 2,410,037 | 10/1946 | Abbott | 221/159 |
| 3,195,705 | 7/1965 | Ochs et al. | 198/288 |
| 3,246,773 | 4/1966 | Hodgkins | 214/6 BA |
| 3,371,795 | 3/1968 | Rosonke | 211/49 D |
| 3,517,482 | 6/1970 | Beninger | 214/6 BA |
| 3,788,456 | 1/1974 | Ashibe | 198/45 |

Primary Examiner—Robert J. Spar
Assistant Examiner—Ross Weaver
Attorney, Agent, or Firm—Kenway & Jenney

[57] ABSTRACT

Apparatus for storing a supply of flat, elongated sticks stacked in an aligned, face-to-face relationship has a double ended guideway formed by rigid guide members closely spaced from the edges of the sticks. The guideway has a first vertical section with a stick input means formed at its lower end, a second vertical section with a stick output means formed at its lower end, and a curved section that connects the upper ends of the vertical sections. Sticks received at the input end advance through the guideway to the output end where they are fed to a high speed stick inserter. In one form, the curved upper section moves vertically with respect to the vertical sections to provide a variable volume storage that maintains a substantially constant pressure within the stack. Devices that sense the vertical position of the upper section, and hence the quantity of stored sticks, control an automatic stick stacking apparatus that adds sticks to the guideway. In another form, the curved upper section is fixed, but has a movable outer rail and associated switching device, responsive to the quantity of stored sticks, which control the stacker. Misaligned sticks inserted into the guideway are rejected through cut-out channels formed in the rails above the input end. Spring loaded pawls that ride the sides of the stack at the cut-out channels eliminate the misaligned sticks. Gates are provided to block the cut-out channels during a low stack pressure condition. The gates are operated manually or by automatic controls responsive to the stick quantity sensing devices.

9 Claims, 9 Drawing Figures

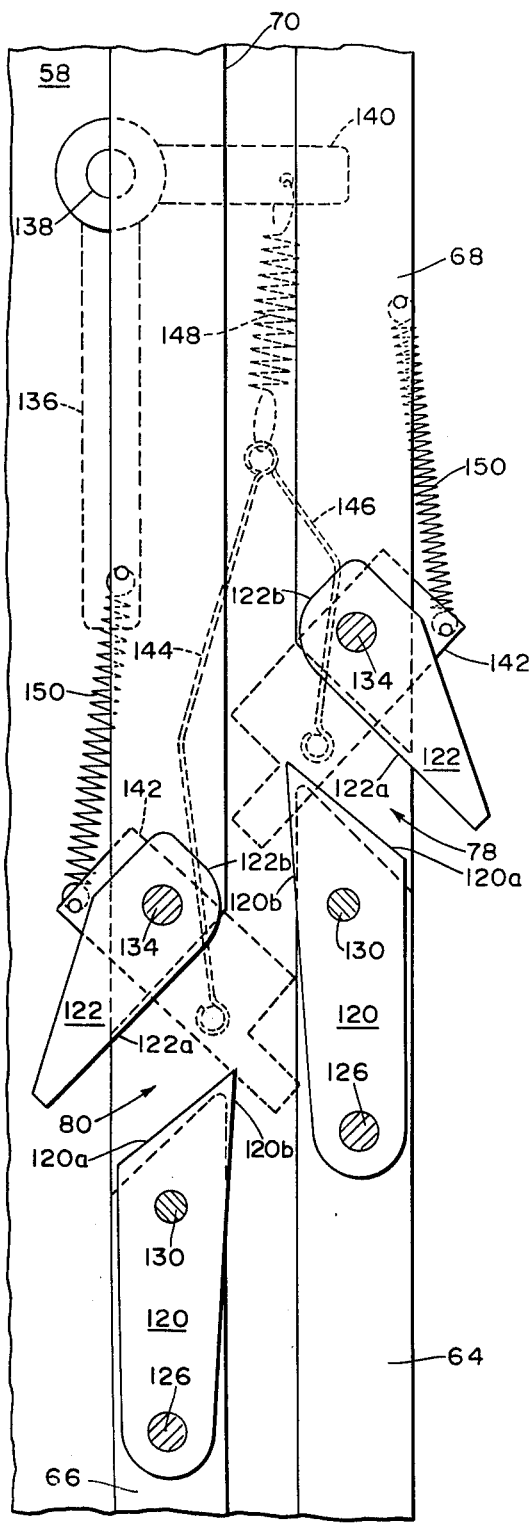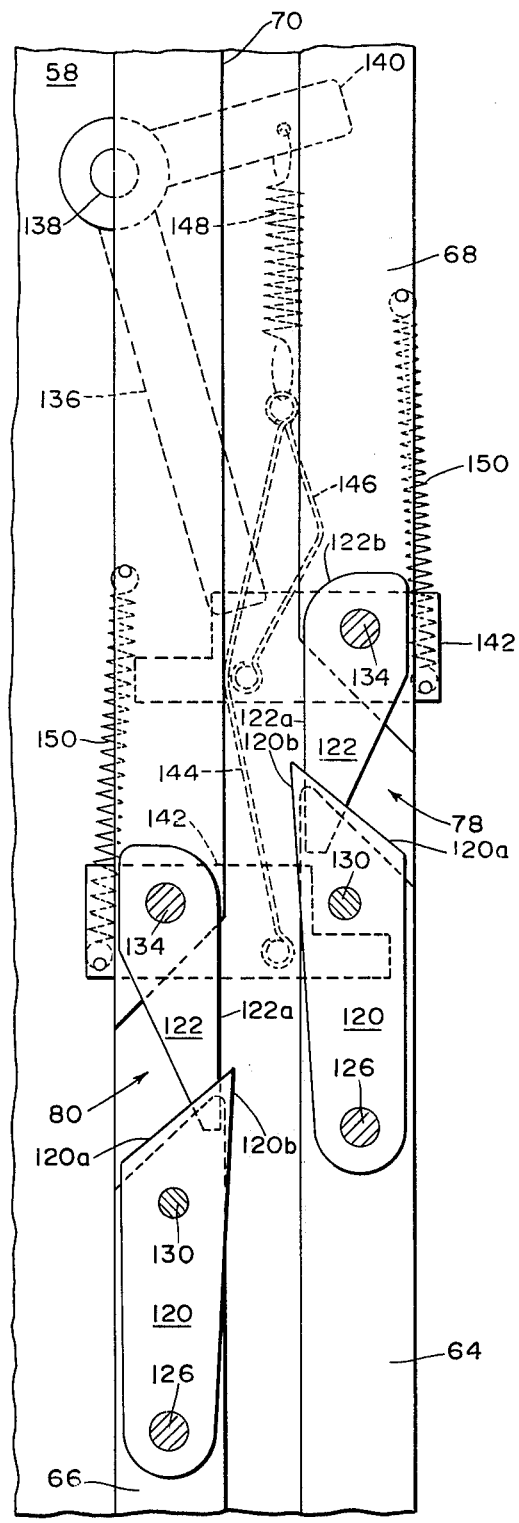

STICK STORAGE APPARATUS WITH AUTOMATIC REJECT SYSTEM FOR MISALIGNED STICKS

BACKGROUND OF THE INVENTION

This invention relates in general to storage and handling apparatus and in particular to storage apparatus for a stack of flat, elongated sticks which operates between an automatic stick stacking apparatus and a high speed stick inserter and has a stick reject system for automatically eliminating misaligned sticks from the stack.

In the manufacture of frozen confection products such as popsicles and the like it is necessary to insert a flat, elongated stick into the molded confection product. A commonly assigned application, Ser. No. 613226 for "Stick Inserter," filed of even date herewith by the present applicant, the disclosure of which is incorporated herein by reference, describes a suitable high speed apparatus for inserting the sticks. The inserter requires that the sticks be supplied periodically at a high rate and in a predetermined array. Since the sticks are typically supplied in bulk cartons and are ordered only to the extent that the sticks in a carton are generally parallel, it is necessary to employ a stick stacker to form these sticks into an aligned stack or stacks which are then fed to the inserter. A type of automatic stick stacking apparatus suitable for this purpose is described in U.S. Pat. No. 3,246,773 to Hogkins, as well as in the aforementioned co-pending application.

Although the stacker is capable of operating at a sufficiently high speed to feed aligned sticks to the inserter without production delays, these devices have different modes of operation and limitations in their physical geometry which prevent a direct feed from the stacker to the inserter. The inserter operates in cycles that allow only a brief part of each cycle for a set of sticks to be supplied to a notched cross conveyor. The cross conveyor is designed to receive sticks fed in a downwardly direction onto its upper run with the sticks seating in the notches as the conveyor translates horizontally at a high speed. The stacker, in contrast, operates at a steady rate, forming vertically oriented stacks of aligned sticks by repeatedly adding sticks to the bottom of the stack.

The vertically oriented storage disclosed in Hodgkins generates an aligned vertical stack of sticks to be fed to an inserter. However, once stacked and stored, the sticks are removed from the vertical storage manually, in relatively small groups, by gripping a portion of the stack with a widejawed spring clamp. The group is then carried to a suitable storage device associated with the inserter, typically a set of inclined racks or guideways. The repeated manual transfer of a limited quantity of sticks between the stacker storage and the inserter storage adversely affects both the operating speed and production cost for the entire stick insertion operation.

U.S. Pat. No. 3,478,703 to Peppler discloses a "surge supply" device for stick storage which avoids the manual transfer of groups of aligned sticks from the stacker to the inserter. The Peppler device utilizes a pair of parallel rigid tracks connected at their bottom ends by a flexible rounded bottom portion formed between an outer endless belt and an inner flanged wheel. This bottom portion is movable in a generally vertical direction to provide a variable volume storage capacity. Sticks are inserted by a "sorting apparatus" into the upper end of one track and removed to an inserter at the upper end of the other track.

The Peppler device, although it does provide a direct link between a sorting apparatus and an inserter apparatus, nevertheless suffers from various disadvantages. First, it does not provide any means for eliminating misaligned sticks from the stack. Such misaligned or disarranged sticks are likely to jam the advance of sticks through the surge supply. To clear the jam, production must be stopped while the surge supply is unloaded and the jam is cleared. Second, the Peppler surge supply is adapted to a downward stick insertion and upward stick feed, which is the opposite of the requirements of applicant's aforementioned high speed inserter and the Hodgkins type stacker.

Finally, the Peppler wheel and belt arrangement and its location at the bottom of the stack are conducive to stick misalignment and jam. In normal operation the stack pressure between adjacent sticks is usually sufficient to maintain the sticks in a face-to-face alignment. However, during a low pressure condition such as during initial loading, replacement of a bulk supply carton, or the rapid removal of a large number of sticks, cross-stick forces at the curved bottom region of the surge supply can predominate over the stack or inter-stick pressure causing the sticks to move out of the face-to-face alignment. More specifically, the weight of the wheel and a radial component of the belt tension, as well as differences in the frictional forces acting on the opposite side edges of the sticks, can twist the sticks about their longitudinal axes, against the inter-stick pressure, into an orientation that is likely to cause the sticks to jam.

It is therefore a principal object of this invention to provide a stick storage apparatus that automatically maintains a stack of aligned sticks at a substantially constant stack pressure to feed a high-speed stick inserter with relatively few interruptions due to stick jams.

A further object of the invention is to provide a system for automatically eliminating misaligned sticks from the storage apparatus.

Yet another object is to provide a stick storage device that has a rigid guideway with upward insertion and downward feed that maintains a substantially constant inter-stick pressure.

SUMMARY OF THE INVENTION

A stick storage device has a guideway defined by rigid guide members in the general shape of an inverted U. The rail members are closely spaced from the edges of the stored sticks to hold them in an aligned, face-to-face relationship as they advance through the guideway. The guideway has a first vertical section with a stick input formed on its lower end, a second vertical section with a stick output also formed on its lower end, and a curved upper section connecting the top ends of the two vertical sections. A stick retention device prevents the sticks from falling out of the first vertical section under the influence of gravity.

In a preferred embodiment, the curved upper section is movable vertically with respect to the vertical sections to provide a variable volume storage capacity at a substantially constant inter-stick pressure. Preferably the weight of the upper section is offset by a counterweight. Devices that sense the vertical position of the upper section control the operation of stick stacker to maintain a predetermined quantity or inventory of sticks in the device. In another form, the curved upper section of the guideways is fixed against vertical movement so that the internal volume of the storage device is substantially constant. The stack pressure, and hence the quantity of sticks stored in the device, is sensed through the movement of a hinged outer rail member forming the curved upper section. The hinged outer rail is operatively connected to a suitable sensing device such as a microswitch.

Misaligned sticks are automatically eliminated from the stack through cut-out channels formed in rail guide members froming the first vertical section. Pawls that bear against the side of the stack at the cut-out channels remove the misaligned sticks. Gates associated with each cut-out channel block the passage of sticks through the channels during a low pressure condition in the stack. The gates are controlled manually or automatically in response to signals generated by the devices that sense the quantity or volume of stored sticks.

These and other features and objects of the invention will be more fully understood from the following detailed description to be read in conjunction with the accompanying drawings.

BRIEF DESCRIPTION OF THE DRAWINGS

FIG. 4 is a detailed view in front elevation of the stick reject system shown in FIGS. 2 and 3 with the gates in the open position;

FIG. 5 is a view corresponding to FIG. 4 with the gates in the closed position;

DETAILED DESCRIPTION OF THE PREFERRED EMBODIMENTS

Figure 1:
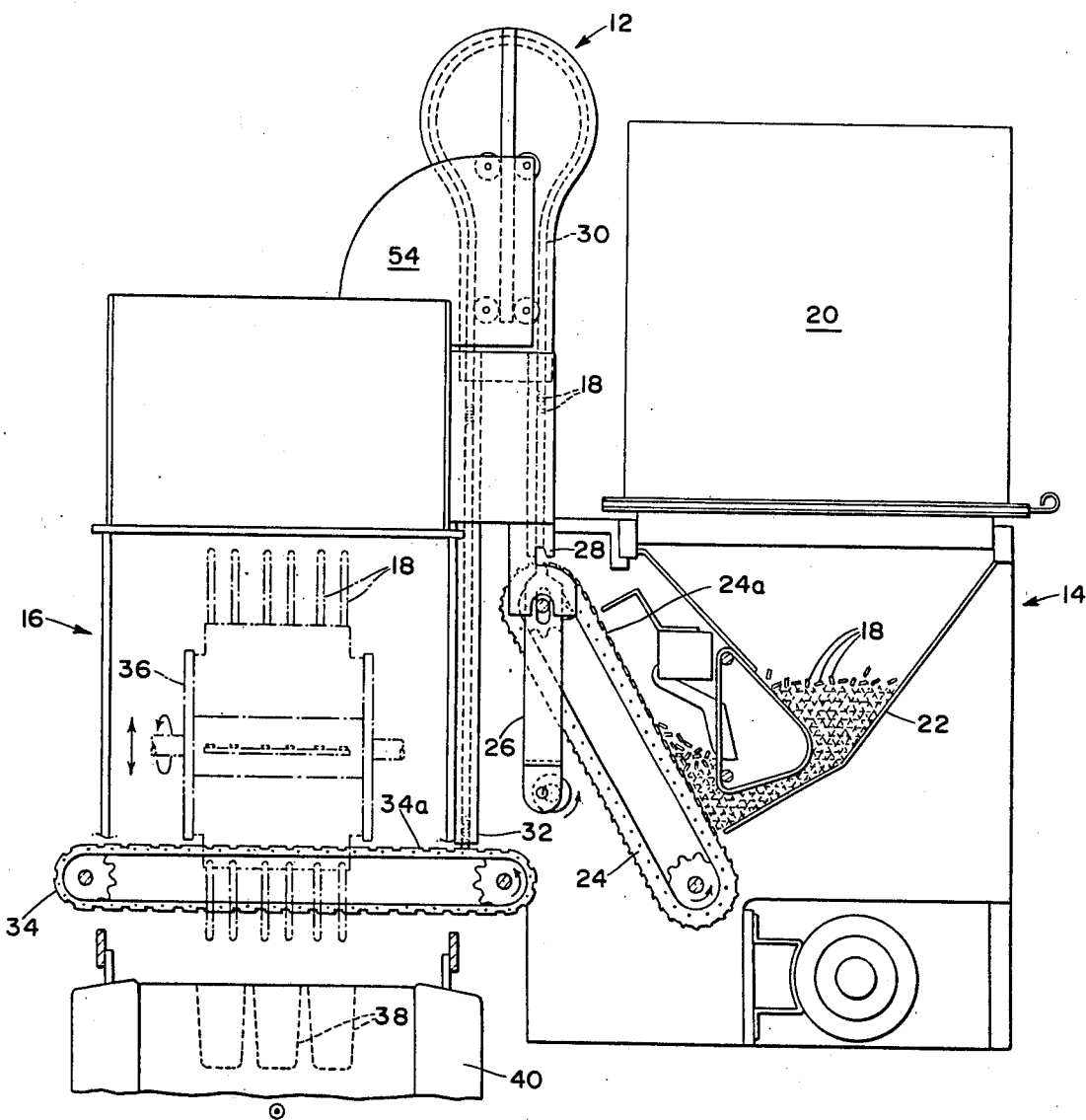
FIG. 1 is a simplified view in front elevation of a stick storage device constructed in accordance with the invention shown in operation between a stick stacking apparatus and a stick inserter apparatus.

FIG. 1 illustrates a preferred embodiment of a stick storage device 12 constructed according to the invention in operation between a stick stacking apparatus 14 and a stick inserter 16 of the type described in applicant's co-pending application, Ser. No. 613226, filed of even date herewith, the disclosure of which is incorporated herein by reference. The stacking apparatus 14 is of the general type described in U.S. Pat. No. 3,246,773 to Hodgkins, as further described in the aforementioned co-pending application. The stacking device receives flat, elongated wooden sticks 18, commonly termed "ice cream" or "popsicle" sticks, from a bulk supply carton 20. In the carton 20 the sticks are generally parallel, but otherwise randomly oriented. A converging wall hopper 22 and an agitator (not shown) direct the sticks to the upper run 24a of an inclined conveyor 24. Forwardly raked teeth on the upper run 24a pick off sticks from the hopper and seat single sticks in slots aligned across the conveyor. At the upper end of the conveyor 24, where the sticks assume a substantially horizontal orientation, a pair of vertically reciprocating arms 26 punch the successive advancing sticks 18 out of the slots upwardly into the input end 28 of the stick storage apparatus 12. The sticks enter the apparatus 12 with a generally horizontal orientation. Occassionally sticks are inserted with a vertical "on edge" orientation. Such sticks are "misaligned" and are likely to jam the storage apparatus unless they are removed.

As the sticks are inserted in the stick storage apparatus 12, they advance through a guideway 30 having the general configuration of an inverted U, described in greater detail hereinbelow. The sticks 18 advance in an aligned face-to-face relationship with the normal to the faces of a given stick being in substantial alignment with the direction of the advance. The sticks held in the guideway 30 provide an inventory which allows the inserter 16 to continue operating during temporary disruptions in the stick supply such as replenishment of the bulk stick supply, stick jams, and minor machine adjustments or malfunctions.

The sticks are discharged from the guideway 30 at an output end 32 located directly over an upper run 34a of a cross conveyor 34. The conveyor 34 is notched or slotted at appropriate intervals corresponding to the desired pattern or array of sticks to be inserted in a row of molded confection products. The cross conveyor 34 translates intermittently at a high speed to strip sticks from the storage apparatus 12. The sticks seat in the notches or slots under pressure from the weight of the upper movable section of the guideway 46. The spacing between the output end 32 and the cross conveyor 34 is such that only one stick seats in a given slot. Each translation of the cross conveyor 34 will normally remove twelve to twenty-eight sticks from the storage apparatus 12 within a fraction of a second.

In coordination with the periodic advance with the cross conveyor 34, a stick carrier 36 grips a set of the sticks at one end while simultaneously inserting a previously gripped set of sticks into a row of molds 38. The molds each contain a partially frozen mush which is further chilled to form the desired frozen confection product having one or more sticks 18 projecting from the product as a handle. Successive rows of the molds 38 are carried on a conveyor 40 which advances the rows in coordination with the operation of the stick carrier 36.

Figure 2:
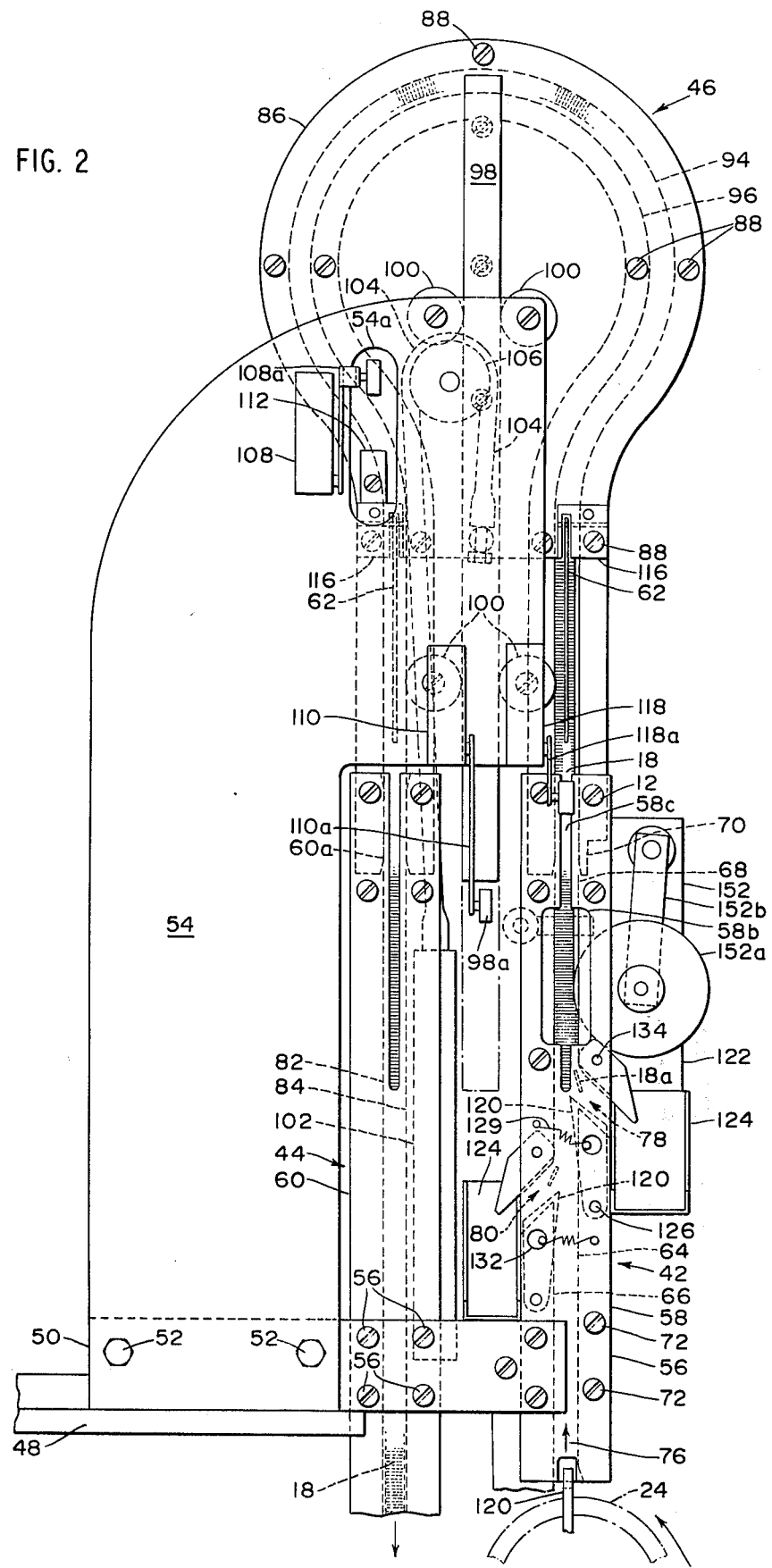
FIG. 2 is a detailed view in front elevation of the stick storage device shown in FIG. 1.
Figure 3:
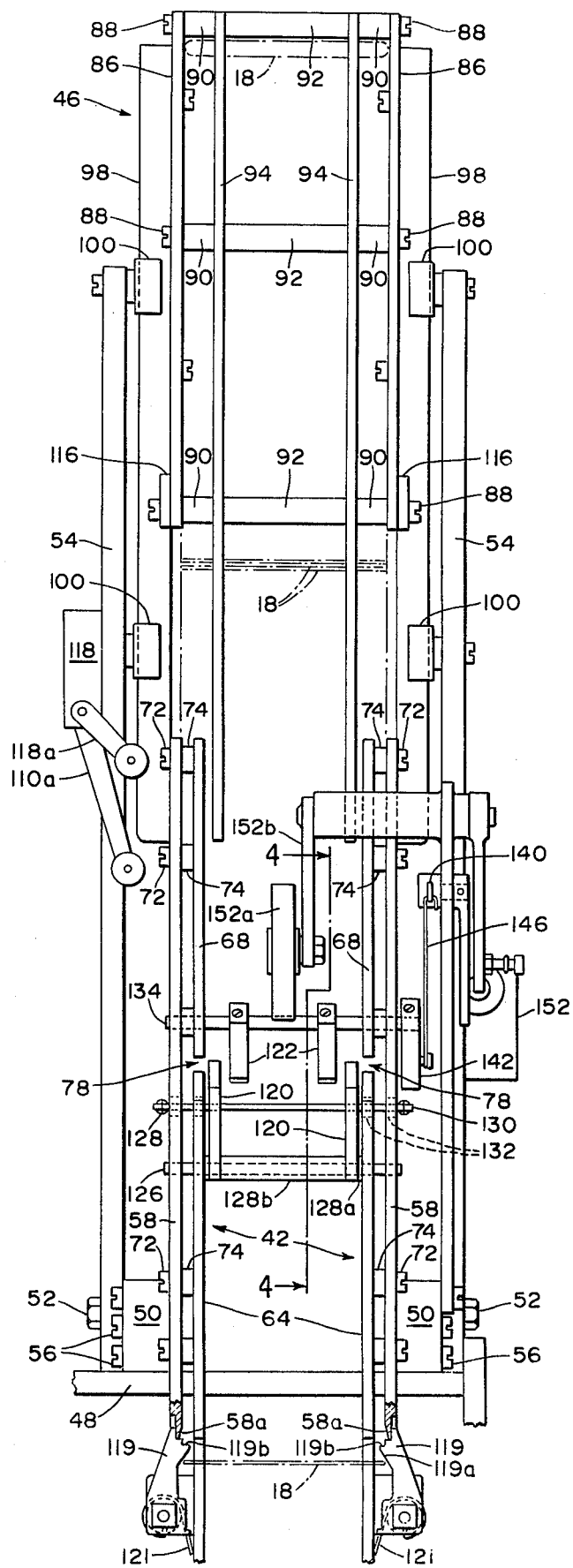
FIG. 3 is a view in right side elevation of the stick storage device shown in FIG. 2.

With reference to FIGS. 2 and 3, the double ended guideway 30 is formed by rigid guide members closely spaced from the rounded ends and side edges of the sticks advancing through the guideway. The guide members can be formed from any suitable structural material having the necessary cleanliness, strength, and low coefficient of friction, such as stainless steel. The guideway consists of three sections, a first vertical section 42 having the stick input end 28 formed at its lower end, a second vertical section 44 with the stick output end 32 formed at its lower end, and a curved or looped upper section 46 telescopically mounted with respect to the vertical sections 42 and 44 to provide a stick advance path that connects the upper ends of the vertical sections.

The stick storage apparatus 12 is mounted on a base plate 48 and a pair of cantilevered support bars 50. Resting on the base plate 48 and secured by screws 52 to the support bars 50 are a pair of parallel, upright support plates 54. Screws 56 secured four generally rectangular and vertically extending end or face plates 58 and 60 which form part of the first and second vertical guideway sections 42 and 44, respectively. The lower edge of the end plate 58 is located directly above the uppermost portion of the inclined conveyor 24 and directly over the reciprocating arms 26. The lower interior edges 58a (FIG. 3) of the end plates are slightly tapered to facilitate the upward insertion of sticks 18 into the guideway. A window 58b formed near the upper end of the plate 58 allows a visual inspection of the stack as it advances upwardly through the first vertical section 42. A deep open slot 58c in end plate 58, and a similar slot 60a in end plate 60, provide a clearance for an end plate 62, which is fastened to the curved upper guideway section 46. The upper ends of the plates 58 and 60 lie in substantially the same horizontal plane, however, as can be best seen in FIG. 1, the end plate 60 extends downwardly past the bottom end of the plate 58 to a point just above the cross conveyor 34.

The vertical section 42 is further defined by pairs of lower rail members 64 and 66 and pairs of upper rail members 68 and 70. Screws 72 and spacers 74 secure and locate these rail members. The facing edges of the rails 64 and 66 and the rails 68 and 70, and the surfaces of the end plate 58, adjacent the sticks are closely spaced from the edges of the sticks 18 to allow the sticks to advance freely through the vertical section 42 in the direction indicated by the arrow 76 (FIG. 2) while maintaining the stack in the proper alignment.

The lower rails 64 and 66 are spaced from the upper rails 68 and 70 to define cut-out channels 78 and 80 located on opposite sides of the vertical section 42. In the vertical section 44, similar screws and spacers secure and locate pairs of vertically extending rails 82 and 84 that provide lateral guidance for the sticks advancing downwardly to the output end 32 of the storage apparatus 12.

The curved upper guideway section 46 has a pair of parallel end or face plates 86 that provide longitudinal or end guidance for the sticks as they progress through the top section 46. Screws 88 and spacers 90 and 92 secure and locate pairs of parallel outer rails 94 and inner rails 96 that provide lateral guidance for the sticks 18. The lower ends of the rails 94 and 96 extend past the upper ends of the lower rails 68, 70, 82, and 84 in a telescoping relationship. The lower facing corners of the rails 94 and 96 are trimmed slightly to guide the sticks into the path defined by these rails. As with the vertical sections, there is a slight clearance between the longitudinal edges of the sticks 18 and the rails 94 and 96 sufficient to allow the sticks to advance through the curved section 46 while providing the support necessary to maintain the stack alignment.

The upper section 46 is movable in a vertical direction with respect to the fixed vertical sections 42 and 44 to provide a variability in the storage capacity of the apparatus 12. This movement also facilitates the maintenance of a substantially constant inter-stick pressure within the stack despite the differences in the rate and mode of operation of the stick stacking apparatus 14 and the inserter 16. To guide the rise and fall movement of the upper portion 46, a pair of vertical rails 98 are mounted to the face plates 86 and supported between opposed pairs of freely rotating rollers 100 mounted on the upright support plates 54. A counterweight 102 offsets a portion of the weight of the section 46. The counterweight 102 acts through a flexible cord 104 which has one end secured to the counterweight and the other end secured to a rod that bridges the face plates 86. The cord 104 rides in a freely rotating sheave 106 mounted on the upright support plates 54.

Microswitches 108 and 110 having wheel-tipped activating arms 108a and 110a, respectively, detect preselected upper and lower limits of the rise and fall movement. When the curved upper section 46 falls to a point where the bottom edge 98a of one of the rails 98 deflects the microswitch activating arm 110a, microswitch 110 activates the stick stacking apparatus 14 to supply additional sticks to the input end 28 of the guideway 30. As additional sticks are fed into the apparatus, the upper section 46 rises to an upper limit position where a camming block 112 deflects the microswitch arm 108a causing the microswitch 108 to deactivate the stacking apparatus 14. In normal operation, as the section 46 rises and falls, the stick inventory and the stack pressure remain substantially constant.

It should be noted that in the normal operating position (FIGS. 2 and 3), the face plate 86 of the upper section 46 is usually spaced from the end plates 58 and 60. The end plate 62 provides longitudinal stick guidance over this spaced portion. The plates 62 are fastened at their upper ends in a mounting block 116 secured at the lower end of the end plate 86 under the screws 88. The length of the end plate 62 is selected so that when the stack pressure falls to a dangerously low level the lower end of the plate deflects a wheel-tipped activating arm 118a of a microswitch 118 to shut down the stacker and the inserter and sound an alarm.

As stick are inserted into the input end 28 by the reciprocating arms 26, a pair of stack latches 119 located at opposite ends of the stick hold the sticks in the guideway against the influence of gravity. As sticks are driven upwardly, they ride the tapered, facing latch surfaces 119a and cam the latches away from the stick against the force of springs 121. When a stick reaches the lowermost end of the guideway, it clears the surfaces 119a and the latches snap back to their original position as illustrated. As the arms 26 withdraw, the stick then rests on the upward facing surfaces 119b of the latches. The arms 26 thus provide the motive force to advance the stack upwardly against the force of gravity, the frictional forces between the sticks and the guide members, and the weight of the upper section 46 not offset by the counterweight 102.

With reference to FIGS. 2–5, an automatic misaligned stick reject system is provided by the cut-out channels 78 and 80, spring loaded pawls 120, gates 122, a gate control assembly described in greater detail below, and chutes 124. The pawls 120 are pivotally mounted near their lower edge on rods 126. Spacers 128a and 128b carried on the rods 126 laterally position each pawl next to one of the cut-out channels 78 or 80. The upper edge 120a of each pawl is downwardly sloped away from the stick stack at an angle roughly the same as that of the rail end surfaces that define the cut-out channels 78 and 80. The pawl corner 120b at the raised end of the edge 120a is positioned to bear against the side edges of the sticks 18 at a point within the cut-out channels and just above the lower rail 64 or 66. Springs 129 acting through rods 130 urge the pawls to rotate about the rods 126 so that the corners 120b ride the stack. Clearance holes 132 formed in the end plates 58 and 60, as well as in the vertical rail members 64 and 66 limit the movement of the rods 130 and hence the degree of rotation of the pawls.

As the stack advances upwardly, the paired set of pawls on each side of the stack push the stacked sticks against the opposite vertical rail member 64 or 70. This lateral displacement provides a clearance for the misaligned stick, carried "on edge" between the stack and a rail member, to pass under the pawl, while eliminating frictional contact between the side edges of the misaligned stick and the faces of properly stacked sticks lying directly above and below these edges. As the misaligned stick passes under the pawl corner 120b, it deflects the pawls away from the stack against the force of the springs 129. When the misaligned stick clears the pawls, they rapidly rotate back to their normal position (as illustrated). Since the misaligned stick is then unsupported, it slides down the smooth, inclined pawl edges 120a, through the cut-out channels 78 or 80, and into one of the chutes 124 where it is collected. FIG. 2 shows two misaligned sticks 18a (in phantom) about to be eliminated from the stack through the cut-out channel 78 and 80 in the manner described above.

During a low pressure condition in the stack there is a likelihood that the entire supply of sticks located above the cut-out channels will fall out of the storage apparatus 12 through the cut-out channels. Such low pressure conditions may be encountered, for example, when the apparatus 12 is initially loaded with sticks, when there is a stick jam in the guideway below the cut-out channels, or when there is a malfunction in the stacking apparatus 12 so that additional sticks are not inserted into the guideway 30 as sticks are removed by the cross conveyor 34. To prevent such a stack loss, a pair of gates 122, secured on a rotatable rod 134, rotate from a normal open position shown in FIG. 4 to a closed position shown in FIG. 5 in which the gates block the passage of any sticks through an associated cut-out channel 78 or 80. Each gate 122 has a blocking surface 122a which is substantially parallel to the interior edges of the adjacent rail members when the gates are in closed position. The upper gate corners 122b proximate to the stack are rounded so that the gates do not project into the guideway 30 when they are open.

When the gates are used in conjunction with a rise and fall storage apparatus of the type illustrated in FIGS. 2 and 3, the inter-stick or stack pressure is reliably maintained at a sufficiently high level that there is little likelihood of losing the stack through the cut-out channels. This problem is therefore usually present only during the initial loading of the apparatus. In view of this situation, the position of the gates is preferably controlled manually. An operating handle 136 (FIGS. 4 and 5), pivotable about a shaft 138, is operatively connected to the gates through lever arms 140 and 142 secured to the rods 138 and 134, respectively, and link rods 144 and 146. A closing movement of the operating handle 136 and a corresponding movement of the lever arm 140 simultaneously closes or opens both sets of gates 122 associated with the cut-out channels 78 and 80. The link arm 144 is bent slightly to prevent interference with the link rod 146 when the gates are in the closed position. A spring 148 which connects the end of the link rods 144 and 146 to the lever arm 140 provides a slight degree of flexibility in the linkages to the gate assemblies to compensate for the differences in the location and length of the link rods 144 and 146. Springs 150 bias the gates to the open position.

In the event that the above described automatic stick reject system fails to eliminate a misaligned stick through the cut-out channels 78 and 80, as the misaligned stick advances upwardly through the vertical section 42 it will deflect a wheel 152a rotatably mounted on a pivotally mounted arm 152b which activates microswitch 152. This deflection triggers the microswitch 152 to completely shut down the stick stacking and inserting operations and to sound an alarm. This misaligned stick can then be manually removed from the guideway through the window 58b, usually with only a brief delay in the production line, if any, and without the necessity of unloading and releasing the entire storage apparatus 12.

Figure 7:
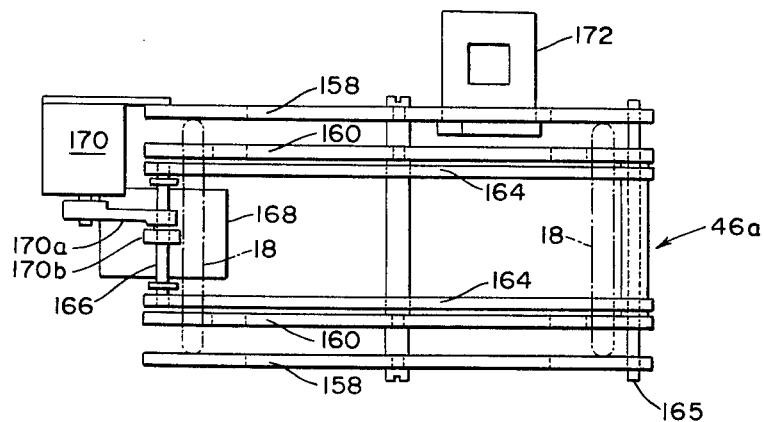
FIG. 7 is a top plan view corresponding to FIG. 6.
Figure 6:
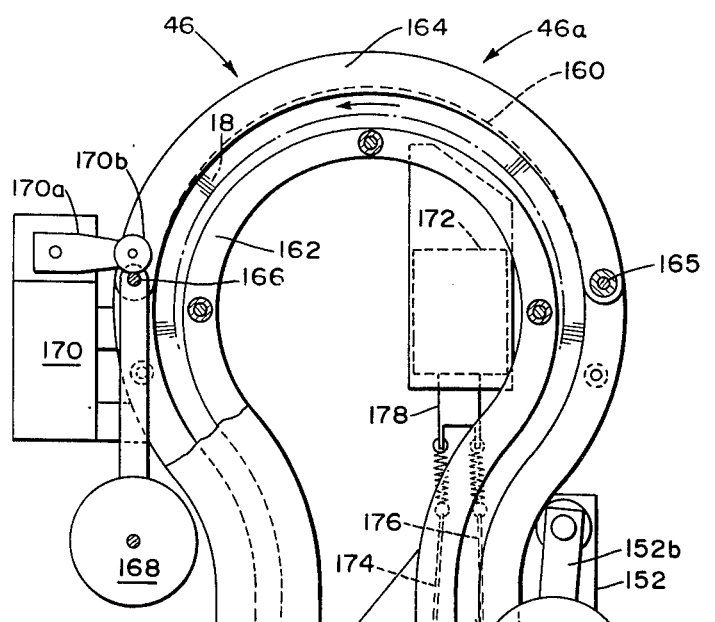
FIG. 6 is a view in front elevation of an alternative stick storage device constructed according to the invention having a substantially fixed internal volume and automatic gate operating apparatus.
Figure 9:
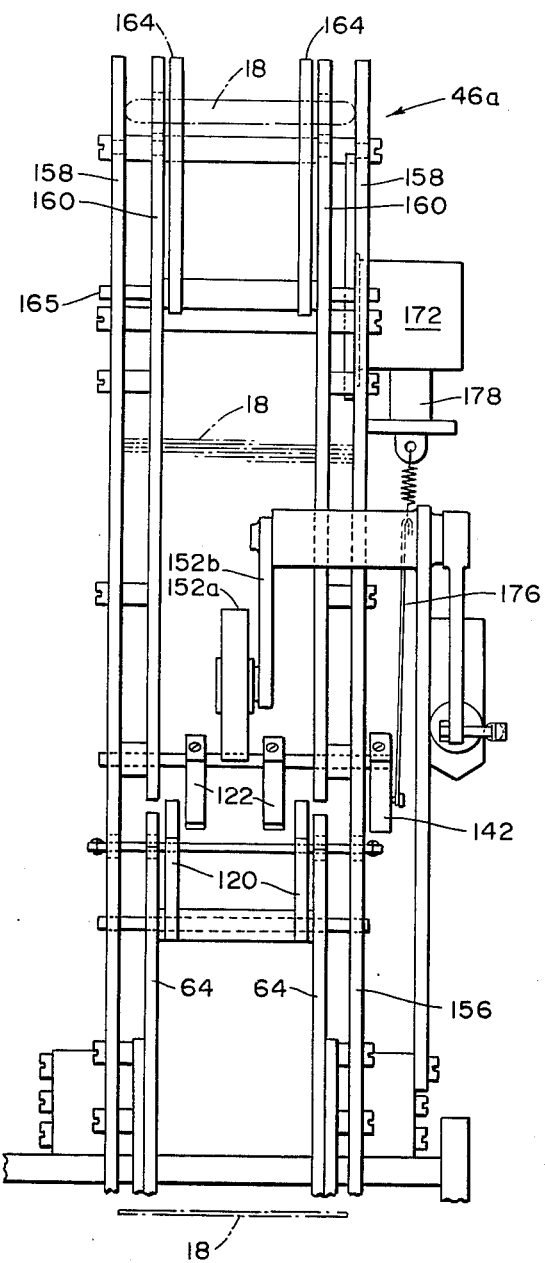
FIG. 9 is a view in right side elevation corresponding to FIG. 6.

FIGS. 6, 7 and 9 illustrate an alternative embodiment of the invention which generally corresponds to the embodiment shown in FIGS. 1–5 except that the curved upper portion of the device is not vertically movable in a rise and fall fashion, but rather is fixed to provide a stick storage apparatus having a substantially constant volume. As with the apparatus shown in FIGS. 1–5, the storage apparatus has a stick guideway 30 with a first vertical section having an input means formed at its lower end, a second vertical section 44 having a stick output means formed at its lower end, and a curved upper section 46 that connects the upper ends of the two vertical sections. The vertical sections have end plates 154 and 156 corresponding generally to elements 58 and 60 of the rise and fall embodiment, and the vertical section has an end plate 158 corresponding to element 86. The first vertical section is further defined by vertical rail members 64 and 66 lying on opposite sides of the stack. The upper ends of the rails 64 and 66 are downwardly sloped to define the cut-out channels 74 and 80 in cooperation with the similarly sloped lower ends of pairs of arcuate outer and inner rails 160 and 162, respectively. It should be noted that the rails 160 and 162 define the guideway 30 over the upper portion of the first vertical section 42, the entire curved upper section 46, as well as the second vertical section 44. Along the vertical sections and the portions of the curved upper section 46 adjacent to the vertical members, the end plates and rail members are closely spaced from the edges of the stacked sticks as described hereinabove, however, along the top portion 46a of the curved section 46 the spacing between the outer and inner track members 160 and 162 widens to allow a slight outward bowing of the stack in response to increases in the stack pressure which, in the absence of a stick jam or malfuction, is indicative of the total quantity of sticks held in the apparatus 12.

Figure 8:
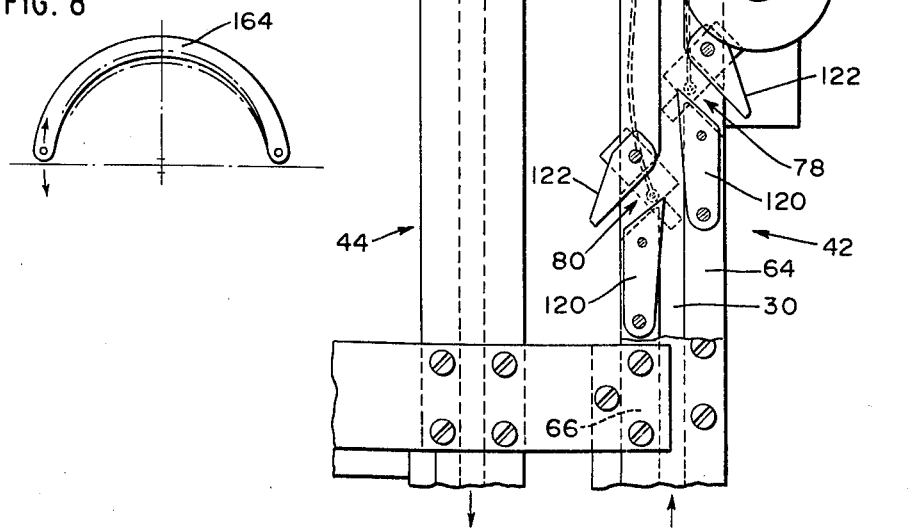
FIG. 8 is a view in front elevation of the hinged outer rail member shown in FIGS. 6 and 7.

The widened top portion 46a is also defined by a pair of mutually parallel, spaced apart rail members 164, shown free-standing in FIG. 8, that are pivotally mounted at one end on a transversely aligned rod 165. The other end of the hinged rails 164 carry another transversely aligned rod 166. A weight 168 suspended from the rod 166 urges the free end of the members 164 in downward direction. A wheel 170b rotatably mounted on an activating arm 170a of a microswitch 170 rides the upper surface of the rod 166.

The outer hinged rails 164 are shaped and positioned so that during a low stack pressure condition the weight 168 pivots the rail members 164 in a generally downward direction that is also generally transverse to the direction of advance of the stack held in the guideway portion 46a. This movement lowers the rod 166 a sufficient distance to trigger the microswitch 170 to activate the stick stacking apparatus 14. As additional sticks are inserted, the stack pressure will increase causing the stack portion held in the upper section 46 to bow in a radially outward direction against the hinged rails 164 and in opposition to the force of the weight 168.

When the stick inventory and the associated stack pressure rise to a preselected operating level, the outward bowing force of the stack pivots the rails 164 a sufficient distance to bring the stack into contact with the outer rails 160. In this position, the rod 166 is raised a sufficient distance to trigger the microswitch 170 to deactivate the stick stacking apparatus 14. Although the pivotal movement of the rails 164 over the widened portion of the upper guideway portion 46a provides a slight degree of variability in the stack inventory or volume, the variability is so small in comparison with that of the rise and fall embodiment previously discussed that the internal volume or stick storage capacity of the apparatus shown in FIGS. 6, 7 and 9 can be considered as substantially constant. Preferably the microswitch 170 will be triggered by the removal of sticks corresponding to a single translation of the cross conveyor 34, or a portion of a single translation, and the stacking apparatus 14 will insert additional sticks into the guideway 30 to change the state of the microswitch before a succeeding translation of the cross conveyor.

The location, configuration and function of the pawls 120, gates 122 and the associated lever arms 142 are the same as in the rise and fall embodiment. The only significant difference lies in the operating or control means which is automatic rather than manual due to the fact that the fixed volume apparatus 12 is somewhat more likely to reach a pressure situation conducive to stack loss through the cut-out channels than the rise and fall embodiment.

A solenoid 172 activated on a time delay by the microswitch 170 is operatively connected to the lever arms 142 by spring loaded linkages 174 and 176. Once the microswitch 170 has sensed a low pressure condition and activated the stacking apparatus 14, if the stick pressure has not risen to a sufficient level to change the state of the microswitch within a predetermined period of time, this extended delay is indicative of a dangerously low pressure condition. The solenoid 172 is therefore activated to draw its armature or core 174 in an upward direction and thereby pivot the lever arms 142 and the gates 122 from their open position to their closed position. When the stack pressure returns to its normal operating level, the microswitch 170 changes its state and deactivates the solenoid 172 causing the armature 174 to lower and reopen the gates 122. As in the rise and fall embodiment, any misaligned sticks not eliminated by the automatic stick reject system are detected by the microswitch 152 through a deflection of its wheel 152a.

The invention therefore provides a reliable and rugged stick storage apparatus that automatically maintains the stick inventory within a preselected pressure range and automatically rejects misaligned sticks that are likely to cause stick jams and resulting production delays. Although the guideway of the stack storage apparatus has been described as defined by combinations of end plates and lateral guide rails, it will be understood that these elements can have alternative configurations and locations provided that there is suitable stack guidance and support in both the longitudinal and lateral stick directions, and provided that the sticks can advance readily through the guideway in a direction that is generally normal to the face of the sticks. Further, the sensing and control functions can be performed by devices other than the limit switch arrangements described above, such as photorelays. Still further, the configuration, biasing, and control of the pawls 120 and the gates 122 can assume a variety of forms without departing from the scope of the invention. These and other modifications will become apparent to those skilled in the art from the foregoing description and the accompanying drawings. Such modifications are intended to fall within the scope of the appended claims.

Having thus described the invention, what is claimed is:

1. Apparatus for storing flat, elongated sticks in an aligned, face-to-face relationship, comprising, in combination, a guideway having a first substantially vertical section with a stick input formed at its lower end, a second substantially vertical section with a stick output formed at its lower end, and a curved upper section connecting the upper ends of said vertical sections, each of said guideway sections being spaced from the ends and side edges of said sticks a sufficient distance to maintain said aligned face-to-face relationship while allowing said sticks to advance within said guideway from said input means to said output means in a direction generally normal to the face of each of said sticks, said upper section being movable vertically with respect to said first and second sections to store a varying number of sticks in said guideway while maintaining a substantially constant inter-stick pressure, means for retaining said sticks in said first vertical section against the influence of gravity, and means for sensing the approximate number of sticks stored in said guideway.

2. Apparatus according to claim 1 in which said upper section is telescopically mounted on said first and second sections and said sensing means comprises limit switches located to trigger when said upper section reaches preselected upper and lower limit positions.

3. Apparatus according to claim 1 wherein said sensing means comprises an arcuate hinged member forming an outer portion of said upper section that is movable in a direction generally transverse to the direction of said sticks held in said guideway, and a microswitch operatively connected to said hinged member, said microswitch being in one state when said guideway holds a preselected number of sticks and in another state when said guideway holds a significantly reduced number of sticks.

4. In an apparatus for storing flat, elongated sticks in an aligned face-to-face relationship comprising a double-ended guideway defined by opposed, spaced apart rail members having stick input and output ends and having a first vertical portion adjacent the input end of said guideway, means for automatically rejecting from said apparatus misaligned sticks not in said face-to-face relationship comprising, in combination, cut-out channels formed in each of said rails of said first vertical portion, above said stick input, pawls pivoted at their lower end and having an upper end positioned in said cut-out channels proximate to the sticks stored in said first section, means for urging the upper end of said pawl towards the guideway, gates movable between a closed position in which they block said cut-out channels and an open position in which they are clear of said cut-out channels, and operating means for opening and closing said gates.

5. Automatic stick reject means according to claim 4 in which said operating means comprises a lever and links operatively connecting said lever and said gates.

6. Automatic stick reject means according to claim 4 in which said operating means comprises a solenoid responsive to the quantity of sticks held in said guideway and linkages operatively connecting said solenoid and said gates.

7. Apparatus for storing flat, elongated sticks in an aligned face-to-face relationship and automatically eliminating misaligned sticks from said apparatus that receives sticks from an automatic stick stacker and feeds them to an automatic, high speed stick inserter, comprising, in combination, a guideway having a first substantially vertical section with a stick input formed at its lower end, a second substantially vertical section with a stick output formed at its lower end, and a curved upper section connecting the upper ends of said vertical sections, each of said guideway sections being spaced from the ends and side edges of said sticks a sufficient distance to maintain said aligned face-to-face relationship while allowing said sticks to advance within said guideway from said input means to said output means in a direction generally normal to the face of each of said sticks, cut-out channels formed in said first vertical section above said stick input means on opposite sides of said sticks, pawls pivoted at their lower end and having an upper end positioned in said cut-out channels proximate to the sticks stored in said first section, means for urging the upper end of said pawl towards the sticks, gates movable between a closed position in which they block said cut-out channels and an open position in which they are clear of said cut-out channels, operating means for opening and closing said gates, means for retaining said sticks in said first vertical section against the influence of gravity, and means for sensing the approximate number of sticks stored in said guideway.

8. Apparatus according to claim 7 in which said upper section is movable vertically with respect to said first and second sections to store a varying number of sticks in said guideway while maintaining a substantially constant inter-stick pressure, and said gate operating means comprises a lever and links operatively connecting said lever and said gates.

9. Apparatus according to claim 7 in which said sensing means comprises an arcuate hinged member forming an outer portion of said upper section that is movable in the direction generally transverse to the direction of said sticks held in said guideway adjacent to said hinged member, and a microswitch operatively connected to said hinged member, said microswitch being in one state when said guideway holds a preselected number of sticks and in another state when said guideway holds a significantly reduced number of sticks, and said gate operating means comprises a solenoid responsive to the quantity of sticks held in said guideway and linkages operatively connecting the said solenoid to said gates.

* * * * *